US009423864B2

(12) United States Patent
Li

(10) Patent No.: US 9,423,864 B2
(45) Date of Patent: Aug. 23, 2016

(54) PCI EXPRESS DEVICE AND LINK ENERGY MANAGEMENT METHOD AND DEVICE

(71) Applicant: HUAWEI TECHNOLOGIES CO., LTD., Shenzhen (CN)

(72) Inventor: Yansong Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 340 days.

(21) Appl. No.: 14/083,826

(22) Filed: Nov. 19, 2013

(65) Prior Publication Data

US 2014/0082251 A1 Mar. 20, 2014

Related U.S. Application Data

(63) Continuation of application No. PCT/CN2011/077657, filed on Jul. 27, 2011.

(51) Int. Cl.
G06F 13/40 (2006.01)
G06F 1/32 (2006.01)
G06F 13/42 (2006.01)

(52) U.S. Cl.
CPC ............ *G06F 1/3278* (2013.01); *G06F 1/3253* (2013.01); *G06F 13/4018* (2013.01); *G06F 13/4022* (2013.01); *G06F 13/4282* (2013.01); *G06F 2213/0026* (2013.01)

(58) Field of Classification Search
CPC ....... G06F 1/32; G06F 1/3203; G06F 1/3234; G06F 1/324; G06F 1/325; G06F 1/3253; G06F 1/3278; G06F 13/38; G06F 13/4004; G06F 13/4009; G06F 13/4018; G06F 13/4022; G06F 13/4265; G06F 13/4282
See application file for complete search history.

(56) References Cited

U.S. PATENT DOCUMENTS 7,099,969 B2 * 8/2006 McAfee .............. G06F 13/4022
710/107
7,136,953 B1 11/2006 Bisson et al. ................. 710/307
(Continued)

FOREIGN PATENT DOCUMENTS

CN 1766799 A 5/2006
CN 1848707 A 10/2006
(Continued)

OTHER PUBLICATIONS

"PCI Express™ Base Specification". Revision 1.0a. Apr. 15, 2003. PSI-SIG.*
(Continued)

*Primary Examiner* — Thomas J Cleary
(74) *Attorney, Agent, or Firm* — Staas & Halsey LLP

(57) ABSTRACT

Embodiments of the present invention disclose a PCI express device, and a link energy management method and device. The method includes: obtaining, by a first device, adjustment information for performing adjustment processing on a current rate and/or bit width of a PCI express link; stopping, by the first device, data sending, and clearing a master enable bit of a configuration space command register of a second device at an opposite end of the link, so that the second device stops data sending after current data sending is finished; performing, by the first device, adjustment processing on the rate and/or bit width of the link according to the adjustment information; resuming, by the first device, the data sending, and resetting the master enable bit, so that the first device and the second device send and receive data again at a rate and/or bit width that is obtained after the adjustment processing.

21 Claims, 5 Drawing Sheets

(56) References Cited

U.S. PATENT DOCUMENTS

| | | | |
|---|---|---|---|
| 7,197,591 B2 * | 3/2007 | Kwa | G06F 1/3203 326/86 |
| 7,426,597 B1 | 9/2008 | Tsu et al. | 710/307 |
| 7,461,195 B1 | 12/2008 | Woodral | |
| 7,852,757 B1 | 12/2010 | Puranik | 370/229 |
| 2006/0265611 A1 | 11/2006 | Wang et al. | 713/300 |
| 2007/0008898 A1 | 1/2007 | Sharma et al. | 370/252 |
| 2007/0067548 A1 * | 3/2007 | Juenger | G06F 13/40 710/315 |
| 2007/0233930 A1 * | 10/2007 | Gallagher | G06F 13/4018 710/307 |
| 2007/0288666 A1 | 12/2007 | Sheng | 710/64 |
| 2008/0022024 A1 * | 1/2008 | Mao | H04L 41/0896 710/104 |
| 2009/0106476 A1 | 4/2009 | Jenkins et al. | 710/315 |
| 2009/0157920 A1 * | 6/2009 | Foster, Sr. | G06F 13/409 710/62 |
| 2009/0164684 A1 * | 6/2009 | Atherton | G06F 13/387 710/300 |
| 2009/0210607 A1 | 8/2009 | Hanscom | |
| 2011/0320861 A1 * | 12/2011 | Bayer | G06F 11/2033 714/5.11 |

FOREIGN PATENT DOCUMENTS

| | | |
|---|---|---|
| CN | 101123511 A | 2/2008 |
| CN | 101198943 A | 6/2008 |
| CN | 101335687 A | 12/2008 |
| CN | 101576865 A | 11/2009 |

OTHER PUBLICATIONS

Luk, Betty, et al. Understanding PCIe® 2.0 Bandwidth Management. 2008. PCI-SIG.*

Nie, Richard. PCI Express® Gen 2 Deep Dlve on Power Architecture® Based Products. Jun. 2010. Freescale Semiconductor. FTF-NET-F0685.*

International Search Report issued Apr. 26, 2012, in corresponding International Patent Application No. PCT/CN2011/077657.

Chinese Search Report issued May 29, 2013, in corresponding Chinese Patent Application No. 201180001310.X.

International Search Report mailed Apr. 26, 2012, in corresponding International Application No. PCT/CN2011/077657.

Extended European Search Report dated May 7, 2015 in corresponding European Patent Application No. 11858152.9.

* cited by examiner

PCI EXPRESS DEVICE AND LINK ENERGY MANAGEMENT METHOD AND DEVICE

CROSS-REFERENCE TO RELATED APPLICATIONS

This application is a continuation of International Application No. PCT/CN2011/077657, filed on Jul. 27, 2011, which is hereby incorporated by reference in their entireties.

TECHNICAL FIELD

Embodiments of the present invention relate to communications technologies, and particularly to a PCI express device, and a link energy management method and device.

BACKGROUND

A peripheral component interconnect express (Peripheral Component Interconnect Express, abbreviated as PCI express) provides a fast point-to-point serial communication link for a PCI express device. While providing sufficient bandwidths for data-intensive applications such as multimedia and high-speed local area networks, the PCI express is confronted with a link energy management problem.

Power consumption in a PCI express link increases as the bandwidth of the link increases, while the bandwidth of the link is associated with a transmission rate and bit width of the link. When traffic in the link is low, a high bandwidth is not necessary, and the bandwidth of the link can be reduced by lowering the transmission rate or bit width of the link, thereby reducing the power consumption of the link. When the traffic in the link rises, the bandwidth of the link is increased by increasing the transmission rate or bit width of the link, so as to satisfy a service requirement of the link. Therefore, energy management of the link can be implemented by adjusting the rate and/or bit width of the link. In the prior art, a PCI express device may control migration of a physical layer state machine according to a traffic volume in the link, and adjust the rate or bit width of the PCI express link by controlling the migration of the physical layer state machine, thereby implementing the link energy management according to the traffic volume. Specifically, when the traffic volume in the link changes, the PCI express device controls its physical layer state machine to enter a recovery state from a normal working state, namely, interrupting current data sending and receiving in the link and entering configuration state. In the configuration state, the PCI express device can obtain a required bandwidth by adjusting the rate or bit width of the link, thereby implementing energy management of the PCI express link.

However, in the above PCI express link energy management process, when the physical layer state machine enters the recovery state from the normal working state, the PCI express device interrupts current data sending and receiving in the link, which results in loss of data being sent and received currently.

SUMMARY

Embodiments of the present invention provide a PCI express device, a link energy management method and device, so as to solve a problem that transmitted data is easily lost in a PCI express link energy management process.

In order to achieve the above, an embodiment of the present invention provides a PCI express link energy management method, which includes:

obtaining, by a first device, adjustment information for performing adjustment processing on a current rate and/or bit width of a PCI express link;

stopping, by the first device, data sending, and clearing a master enable bit of a configuration space command register of a second device at an opposite end of the link, so that the second device stops data sending after current data sending is finished;

performing, by the first device, adjustment processing on the rate and/or bit width of the link according to the adjustment information; and resuming, by the first device, the data sending, and resetting the master enable bit, so that the first device and the second device send and receive data again at a rate and/or bit width that is obtained after the adjustment processing.

An embodiment of the present invention further provides a PCI express device, including:

an obtaining module, configured to obtain adjustment information for performing adjustment processing on a current rate and/or bit width of a PCI express link;

a control module, configured to stop data sending of the PCI express device, and clear a master enable bit of a configuration space command register of a device at an opposite end of the link, so that the device at the opposite end stops data sending after current data sending is finished; and further configured to, after adjustment processing on the rate and/or bit width of the link, resume the data sending of the PCI express device, and reset the master enable bit, so that the PCI express device and the device at the opposite end send and receive data again at a rate and/or bit width that is obtained after the adjustment processing; and a processing module, configured to perform the adjustment processing on the rate and/or bit width of the link according to the adjustment information.

An embodiment of the present invention further provides a PCI express link energy management system, including: a first device and a second device that send data to and receive data from each other, wherein the first device is the above PCI express device, and the second device is an endpoint device of a PCI express or a device at an uplink interface of a PCI express switch.

According to the above technical solutions, a PCI express device implements link energy management through dynamically adjusting a rate and/or bit width of a link. In addition, before the adjustment on the rate and/or bit width of the link, a master enable bit of a configuration space command register of a device at an opposite end of the link is cleared, so that the device at the opposite end of the link stops data sending after current data sending is finished, ensuring that data being sent and received in the link is not lost due to the link adjustment, thereby ensuring that a link service is not affected by the link adjustment.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may still derive other drawings from the accompanying drawings without creative efforts.

DETAILED DESCRIPTION OF THE EMBODIMENTS

To make the aspects, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

Figure 1:
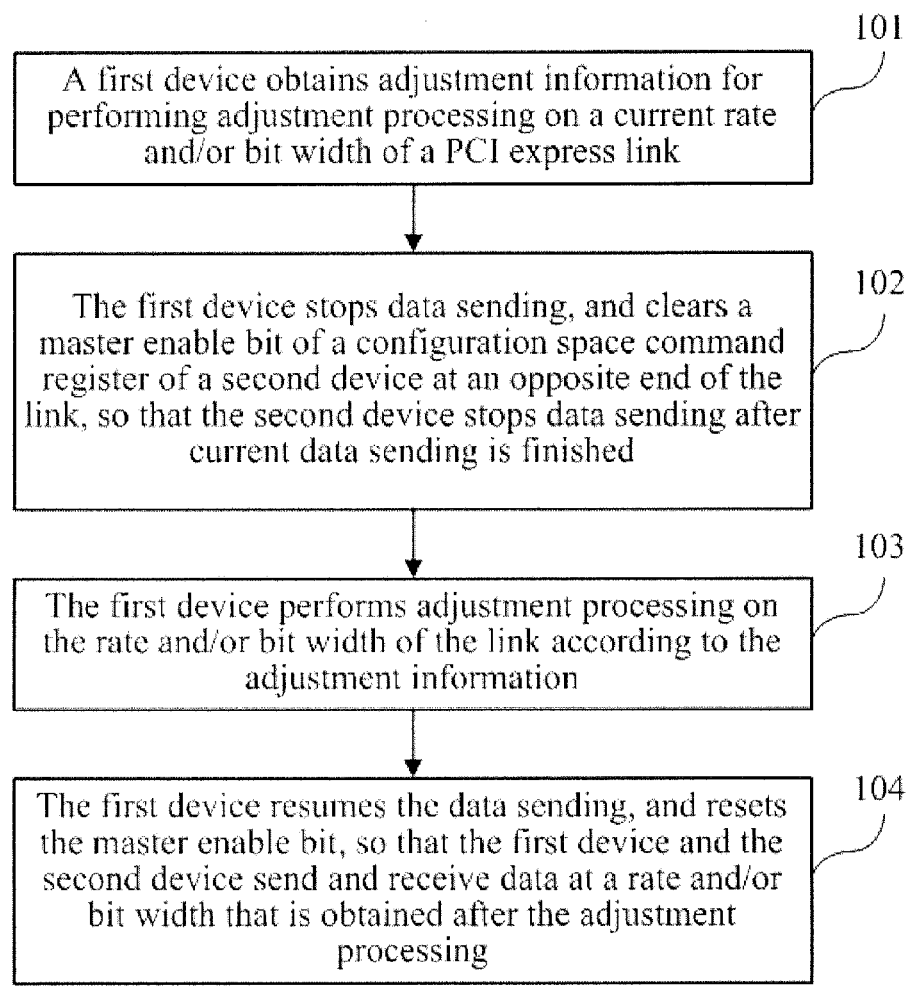
FIG. 1 is a flow chart of an embodiment of a PCI express link energy management method according to the present invention.

FIG. 1 is a flow chart of an embodiment of a PCI express link energy management method according to the present invention. As shown in FIG. 1, the method in this embodiment includes:

Step 101: A first device obtains adjustment information for performing adjustment processing on a current rate and/or bit width of a PCI express link.

In this embodiment, the first device and a second device are PCI express devices that send data to or receive data from each other through a PCI express link. The first device may be a root complex device (Root Complex) of a PCI express or a device at a downlink interface of a PCI express switch (switch). The second device may be an endpoint device (Endpoint) of a PCI express or a device at an uplink interface of a PCI express switch. When the current data transmission rate, bit width and so on of the link needs to be adjusted, the first device may take corresponding measures to perform adjustment processing on the link according to the obtained adjustment information for performing adjustment processing on the current rate and/or bit width of the PCI express link.

In practical applications, the adjustment information obtained by the first device may be information generated through a trigger after the first device detects a link parameter, a working state, and so on; the adjustment information may also be configuration information for performing adjustment on the link, for example, information set by a user for adjusting the link. Traffic in the PCI express link changes dynamically along with a service requirement of the PCI express device. For example, traffic of a telecom device is low before dawn every day, and if the same communication bandwidth as the daytime is used before dawn, energy consumption is considerable. When services are busy, if a bandwidth of a communication link is insufficient, a communication service is affected. Therefore, the PCI express device should be capable of dynamically adjusting a bandwidth of a link as traffic of the link changes. Specifically, the PCI express device may control generating of adjustment information by detecting the traffic of the link and so on.

Step 102: The first device stops data sending, and clears a master enable bit of a configuration space command register of the second device at an opposite end of the link, so that the second device stops data sending after current data sending is finished.

After obtaining the adjustment information, the first device proactively stops data sending at a local end, and meanwhile clears the master enable bit of the second device at the opposite end of the PCI express link, so that the second device stops transmitting new data after the transmission of a current data packet is finished. After both the first device and second device stop data sending, no data is sent or received in the link, and in this case, the first device can perform required adjustment on the link. The master enable bit in this embodiment is bit 2 (master enable) in a 16-bit command register at an offset address 04 in a configuration space of the second device. The master enable bit indicates whether this PCI express device is capable of sending out data as a master device. When the master enable bit is 1, the device is capable of proactively sending data to the PCI express link; when the master enable bit is 0, the device is incapable of proactively sending data, but can only be passively accessed by other devices. A PCI express device such as an Ethernet controller is used as an example for description. A side of the Ethernet controller is connected to the PCI express link, and another side of the Ethernet controller is connected to an Ethernet link. Data transmission between the Ethernet and PCI express is implemented through the Ethernet controller. For example, the Ethernet controller forwards a data packet received from the Ethernet to the PCI express link. After a master enable bit of the Ethernet controller is cleared, the Ethernet controller does not proactively sends data, including a data packet and a message packet, to the PCI express link at the PCI express side, and at the same time, the Ethernet controller sends a stream control packet to the Ethernet link side, requiring a device at the Ethernet link side not to send data to the Ethernet controller, which can be implemented in two manners. One manner is an Xon/Xoff mechanism, in which some parameter of the stream control packet is used to indicate that sending is allowed or forbidden; the other manner is a depletion mechanism, in which some parameter in the stream control packet is used to indicate that the device at the opposite side needs to wait a certain period of time and can continue sending after the time is up. In this embodiment, the first device sets the master enable bit of the second device so as to control the data sending of the second device. When the first device needs to stop the second device from sending data to the first device, the first device may clear the master enable bit of the second device, and the second device proactively stops sending data to the PCI express link after the master enable bit is cleared, so that the second device is stopped from sending data to the first device.

In specific applications, the first device may wait a preset period of time after clearing the master enable bit of the second device at the opposite end of the link, so that the second device adjusts the link after finishing sending of a current data packet. Specifically, after clearing the master enable bit of the configuration space command register of the second device at the opposite end of the link, the first device waits a preset period of time and generates stop information. The preset period of time for waiting can be estimated according to the maximum packet length defined in PCI express specifications and the current transmission rate of the link, the waiting time generally does not exceed 1 millisecond. Alternatively, the first device generates stop information after obtaining a finish flag of the received current data packet sent by the second device; the first device then starts adjustment processing on the rate and/or bit width of the link according to the stop information.

Step 103: The first device performs adjustment processing on the rate and/or bit width of the link according to the adjustment information.

After the devices at two ends of the PCI express link stop sending and receiving data, the first device may adjusts the rate and bit width of the link according to the obtained adjustment information. If the traffic in the link is low, the transmission rate or bit width of the link is lowered, or the rate and bit width of the link are lowered at the same time, so as to save power consumption of the link. When the traffic in the link is high, the transmission rate or bit width of the link is increased, or the rate and bit width of the link are increased at the same time, so as to meet a service requirement of link transmission.

The PCI express device is configured with different control and status registers according to the definition in the PCI express specifications. By setting an enable bit value of a register, the device is enabled to perform or disabled from performing a corresponding function or obtains some state values. Registers involved in the embodiment of the present invention include a link control (link control) register, a link status (link status) register, a link control 2 (link control 2) register, and so on. Bit 5 (retrain link) of the link control register is an enable bit for triggering re-negotiation between two ends of the link. Bit 11 (link training) of the link status register stores a link negotiation state value that indicates whether negotiation of the link is finished, bit 3 to bit 0 of the link status register store a current transmission rate value of the link, and bit 9 to bit 4 of the link status register store the current bit width of the link. An expected link rate value may be set in bit 3 to bit 0 of the link control 2 register. In addition, different chip providers may also customize some expanded register functions in their chip products according to particular requirements.

In specific implementation, after adjusting the rate and/or bit width of the link, the first device may further start re-negotiation with the second device, so that the first device and the second device adjust rates and/or bit widths for sending and receiving data to a rate and/or bit width of the link that is obtained after adjustment processing, thereby ensuring that the rates and bit widths for sending and receiving data at the two ends match a rate and bit width of the link that have been adjusted by the first device. The first device resumes the data sending and receiving at the two ends of the link after the devices at the two ends finish re-negotiation and it is confirmed that the negotiation is completed. Specifically, after the PCI express device performs adjustment processing on the link, if bit 5 of the link control register is 1, the PCI express device starts re-negotiation with the device at the opposite end of the link. After the re-negotiation, the PCI express device confirms that the negotiation is completed through bit 11 of the link status register. Each time the PCI express device adjusts the rate and/or bit width of the link, a corresponding rate and bit width in bit 3 to bit 0 and bit 9 to bit 4 of the link status register are updated according to the adjustment. Therefore, the PCI express device may further determine whether the rate and bit width after negotiation are the same with an expected rate and bit width through bit 3 to bit 0 and bit 9 to bit 4 of the link status register. After it is confirmed that the re-negotiation is completed, the first device can send and receive data again with the rate and bit width corresponding to the bit 3 to bit 0 and bit 9 to bit 4 of the link status register.

In this step, the first device may adjust the rate of the link according to the obtained adjustment information, and may also adjust the bit width of the link, or adjust the rate and bit width of the link at the same time.

Optionally, when performing adjustment on the rate of the link, the first device may perform the adjustment by directly setting an expected link rate. Specifically, if the obtained adjustment information is lowering or increasing the current rate of the link to a certain link rate, the first device may write the link rate into bit 3 to bit 0 of the link control 2 register; in this way, when adjusting the current rate of the link, the first device may perform adjustment processing on the current rate of the link according to a rate value written in the bit 3 to bit 0 of the link control 2 register.

Optionally, when performing adjustment on the bit width of the link, the first device may perform adjustment by setting a lane disabling function of an interface link. Specifically, if the obtained adjustment information is lowering the current bit width of the link to a certain link bit width, the first device adjusts the current bit width of the link by closing any interface link lane between the link bit width and an upper-level link bit width of the link bit width. An initial bit width of the link being ×8 (lane 0 to lane 7 are defined) is taken as an example for description. When it is expected to adjust the link bit width to ×4, one of lane 4 to lane 7 needs to be closed; if it is expected to adjust the link bit width to ×2, either of lane 2 and lane 3 needs to be closed; if it is expected to adjust the link bit width to ×1, lane 1 needs to be closed. In cases that an initial bit width is 32, 16, 4, 2, and so on, the configuration operating method is similar. If the adjustment information is increasing the current bit width of the link to a certain link bit width, the first device adjusts the current bit width of the link by opening all interface link lanes corresponding to the link bit width. For example, when the bit width needs to be restored to ×8 from the current bit width ×4, all of lane 4 to lane 7 should be enabled; if the bit width needs to be restored to ×8 from ×1, all of lane 1 to lane 7 should be enabled. Such an adjustment manner for the link bit width is implemented on the basis that most PCI express devices do not have a dynamic bit width adjustment function, but generally provide an enable function for some lane (lane) of the interface link. By using this function of the lane, the embodiment of the present invention simulates a failure of some link by closing a lane. When detecting a link failure, the PCI express device proactively triggers re-negotiation (retrain) between the device and the device at the opposite end and re-determines a bit width of the link, so as to mask the failed link, thereby obtaining a smaller bit width. When the link bit width needs to be increased, the PCI express device may first enable and open a previously masked lane, then proactively trigger re-negotiation between the device and the device at the opposite end, and re-determine a bit width of the link, so as to obtain a greater bit width. In this way, a device without a bit width adjustment function can adjust the bit width of the link through controlling the enable function of the interface link lane. That is, bit width adjustment is implemented on the device without a bit width adjustment function, thereby achieving the link energy management. In addition, the PCI express supports various bit widths, for example, in some link, 1 lane, 2 lanes, 4 lanes, 8 lanes, 16 lanes and 32 lanes may be selected, that is, the link supports bit widths of ×1, ×2, ×4, ×8, ×16, and ×32, and the bit width can be configured flexibly according to a specific application. The bit width of the link is adjusted by setting the lane disabling function of the interface link, so that the link energy management is more flexible.

Optionally, the first device may further adjust the bit width of the link by directly setting an expected bit width. Specifically, if the obtained adjustment information is lowering or increasing the current bit width of the link to an expected link bit width, the first device adjusts the current bit width of the link by setting the current bit width of the link to the expected link bit width. In specific applications, this manner may be implemented through a method similar to the above method for adjusting the rate.

Step 104: The first device resumes the data sending, and resets the master enable bit, so that the first device and the second device send and receive data again at a rate and/or bit width that is obtained after the adjustment processing.

After the adjustment processing on the link is finished, data sending and receiving in the link need to be resumed in time. For the local end, the first device may proactively start sending data to the link, and for the opposite end of the link, the first device resets the master enable bit of the second device, so that the second device resends data to the link. A link adjustment is completed when two ends of the link resume data sending and receiving at the rate and/or bit width that is obtained after the adjustment processing. If the rate and/or bit width of the link needs to be dynamically adjusted according to the traffic in the link, the above steps are repeated.

In this embodiment, the first device does not directly interrupt data sending and receiving at two ends after obtaining the adjustment information for adjusting the link; instead, the first device takes protection measures for current data sending and receiving in the link, so as to avoid loss of data being sent or received. During normal operation, two ends of the PCI express link transmit data to and receive data from the PCI express link; if the link device adjusts the rate or bit width without any protection while an upper layer of the link device, such as a software layer or a device core layer, continues data sending, data is inevitably lost. Therefore, it is necessary to stop the data sending in the upper layer before starting the link adjustment re-negotiation. Data sending is resumed after the adjustment is finished, thereby preventing the operation at the bottom layer of the link from affecting the service. In this embodiment, the first device of the link that initiates the adjustment proactively stops the data sending at the local end and clears the master enable bit of the configuration space command register of the second device at the opposite end of the link, so as to control the device at the opposite end to stop data sending after the current data sending is finished. In one aspect, the device at the opposite end controls its upper layer to notify other devices, which send data through the device at the opposite end to the PCI express link, to suspend sending data to the device at the opposite end; in another aspect, the device at the opposite end stops sending a new data packet after finishing sending of the current data packet sent to the PCI express link, so that the first device adjusts the link after data sending at two ends of the link is stopped, thereby ensuring that a service is not affected by the link adjustment.

In the embodiment of the present invention, link energy management is implemented through adjusting a rate and/or bit width of a link. In addition, before the adjustment on the rate and/or bit width of the link, a master enable bit of a configuration space command register of a device at an opposite end of the link is cleared, so that the device at the opposite end of the link stops data sending after current data sending is finished, ensuring that data being sent in the link is not lost due to the link adjustment, thereby ensuring that a link service is not affected by the link adjustment. Furthermore, an enable function of the interface link lane is set to simulate a link failure, so as to implement adjustment of the bit width of the link through a device without a bit width adjustment function, so that a more flexible bit width adjustment manner is used for the link energy management.

In the above embodiment, before obtaining the adjustment information for adjusting the link, the first device may further determine whether the rate or bit width can be adjusted by detecting and determining current link state, and determine what condition need to be satisfied to adjust the rate or bit width link of the link.

Figure 2:
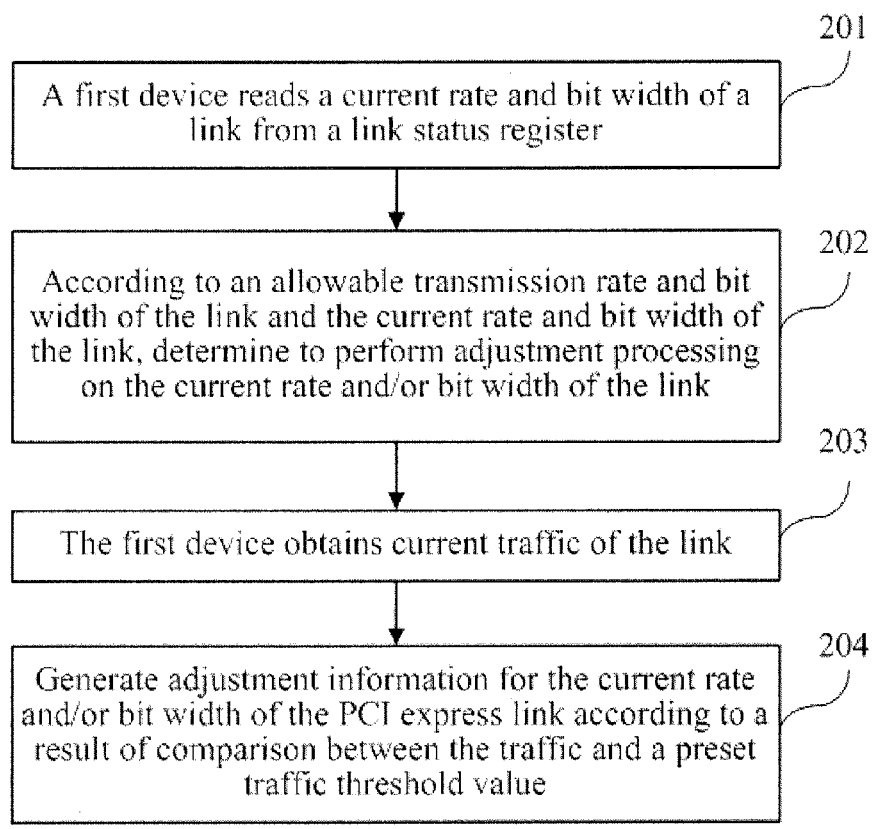
FIG. 2 is a partial flow chart of another embodiment of a PCI express link energy management method according to the present invention.

FIG. 2 is a partial flow chart of another embodiment of a PCI express link energy management method according to the present invention. As shown in FIG. 2, before step 101 shown in FIG. 1, the method in this embodiment further includes:

Step 201: A first device reads a current rate and bit width of a link from a link status register.

Step 202: According to an allowable transmission rate and bit width of the link and the current rate and bit width of the link, determine to perform adjustment processing on the current rate and/or bit width of the link.

During operation, the first device may read a current transmission rate value and a bit width value of the link from bit 3 to bit 0 and bit 9 to bit 0 of the link status register respectively, and determine, according to the obtained rate and bit width, whether the current transmission rate and bit width can be adjusted. For example, the current rate of the link is 2.5 Gbps and the current bit width is ×8, while the allowable minimum transmission rate of the link is 2.5 Gbps and the maximum bit width is ×8. If the bandwidth of the link needs to be lowered, only the bit width can be adjusted, and the rate cannot be adjusted; if the bandwidth of the link needs to be increased, only the rate can be adjusted, and the bit width cannot be adjusted. When the current rate and bit width of the link are other values, or limit values of the allowable transmission rate and bit width of the link are other values, the method for determining whether the rate and/or bit width can be adjusted is similar. Therefore, the first device can determine, according to the current rate and bit width, whether to adjust the rate and/or bit width of the link.

Step 203: The first device obtains current traffic of the link.

Specifically, a manner for the first device to obtain the current traffic of the link includes but is not limited to the following:

The first device obtains the number of interruption times or a count of packets sent and received through the link within unit time, and determines the current traffic of the link according to the number of interruption times or the count of packets.

After determining whether the rate and/or bit width of the link can be adjusted, the first device determines, by detecting the traffic of the link in real time, whether current rate and/or bit width needs to be adjusted.

Step 204: Generate adjustment information for the current rate and/or bit width of the PCI express link according to a result of comparison between the traffic and a preset traffic threshold value.

The first device compares the obtained traffic and the preset traffic threshold value, and generates corresponding adjustment information according to the result of the comparison, so as to start adjustment on the link according to the adjustment information.

Specifically, if there is one preset traffic threshold value, traffic obtained each time is compared with the traffic threshold value. If the traffic is greater than the traffic threshold value, it indicates that services in the link are busy, and the current bandwidth of the link needs to be increased so as to meet a service requirement when the link is busy. Therefore, the current rate and/or bit width can be increased. If the traffic is smaller than the traffic threshold value, it indicates that there are few services in the link, and the current bandwidth of the link needs to be lowered so as to reduce the power consumption when the link is not busy.

If there are multiple preset traffic threshold values, and each traffic threshold value corresponds to a rate and bit width of a specific bandwidth of the link, the first device may compare traffic obtained each time with a different traffic threshold value, so that the device performs adjustment in stages according to the volume of the traffic, and is capable of precisely adjusting the current rate and bit width of the link to proper values. Specific operations are described as follows: the first device generates, according to a result of comparison between the traffic and a certain preset traffic threshold value, adjustment information for adjusting the current rate and/or bit width of the link to a rate and bit width corresponding to the traffic threshold value. For example, a current rate of an interface link of the PCI express device is 5 Gbps, and a bit width is ×8, where both the rate and bit width can be lowered; traffic is segmented by two thresholds, namely Thr1 and Thr2, where Thr1>Thr2. The first threshold Thr1 and the second threshold Thr2 correspond to different bandwidths. The bandwidth may be adjusted by adjusting the rate, or by adjusting the bit width, or by adjusting both the rate and the bit width. When the traffic is lower than the first threshold Thr1, the rate of the link may be lowered from 5 Gbps to 2.5 Gbps, or the bit width of the link is lowered to ×4. When the traffic is lower than the second threshold Thr2, if the bit width is ×4 after previous downward adjustment of the bandwidth, the link bit width may further be lowered to ×1; if it is the rate that is lowered last time, the bit width may be lowered from ×8 to ×4 at this time of adjustment. If the current rate is 2.5 Gbps and the bit width is ×1, when the traffic exceeds the second threshold Thr2, the rate of the link may be increased from 2.5 Gbps to 5 Gbps, or the bit width may be increased from ×1 to ×4. When the traffic further exceeds the first threshold Thr1, if it is the bit width that is increased last time, the bit width may further be increased from ×4 to ×8; if it is the rate that is increased last time, the bit width may be increased from ×1 to ×4. When the current rate and bit width of the link are other values, or the traffic is segmented by more thresholds, the adjustment method is similar.

The amount of data sent and received between the first device and the second device changes along with service requirements of the devices, so the transmission traffic in the link changes dynamically. Setting multiple traffic threshold values is more applicable to dynamic adjustment when the traffic in the link changes dynamically in practical applications. In such a dynamic adjustment manner, the bandwidth of the link is lowered when services are not busy so as to reduce the power consumption in the link, and the bandwidth is increased when services are busy so as to meet the service requirement.

In the embodiment of the present invention, based on the technical effect achieved in the embodiment shown in FIG. 1, the first device further determines, according to the obtained current rate and bit width, whether the link can be adjusted, and generates corresponding adjustment information when the traffic in the link satisfies an adjustment condition, so as to start adjustment on the link. Furthermore, multiple traffic threshold values are set, so that the device performs adjustment in stages according to the traffic volume, and is capable of precisely adjusting the current rate and bit width of the link to proper values, which not only ensures the real-time service requirement of the link, but also effectively manages energy of the link.

Figure 3:
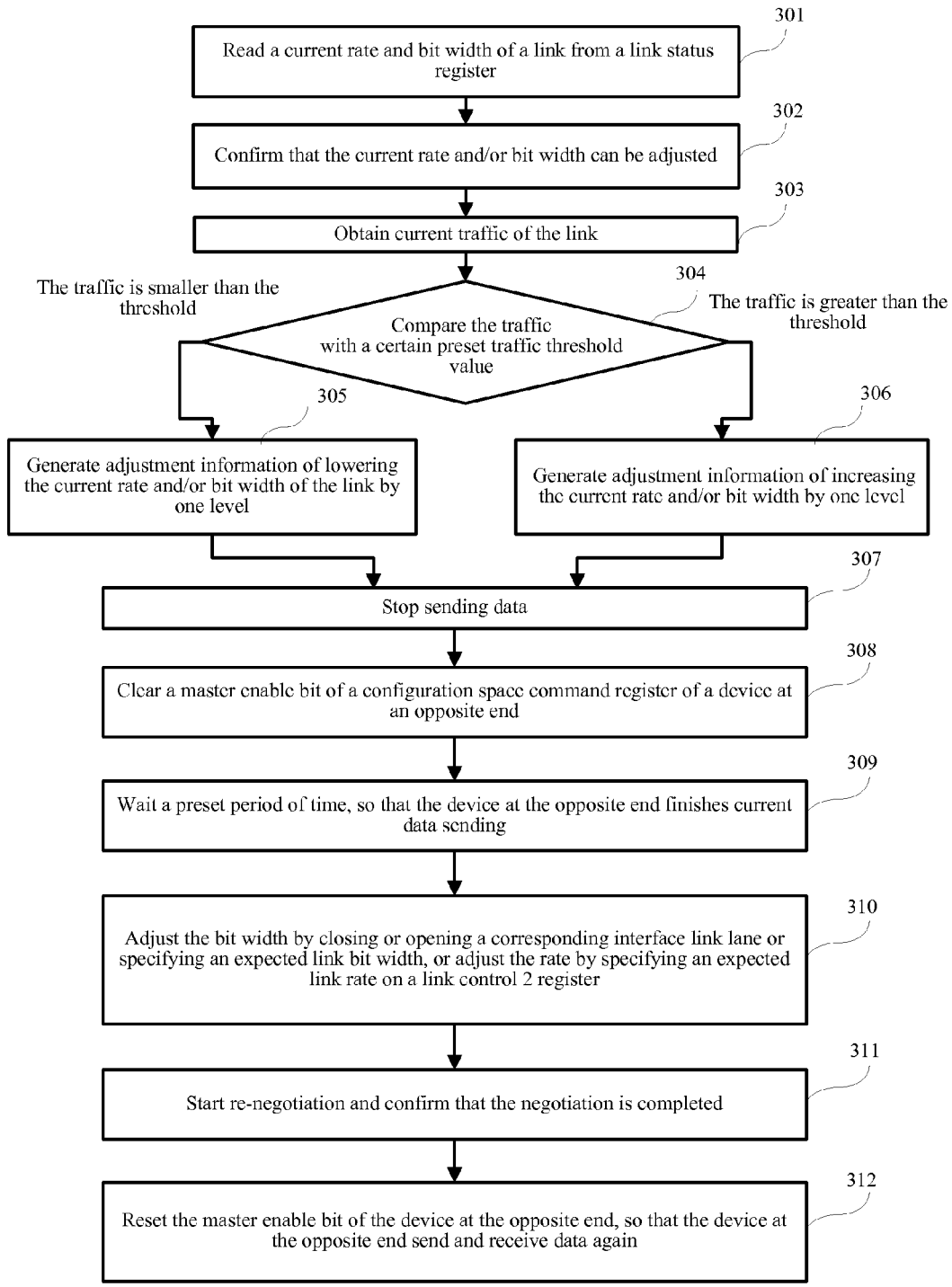
FIG. 3 is a detailed flow chart illustrating energy management performed on a link by a first device in running process according to an embodiment of the present invention.

FIG. 3 is a detailed flow chart illustrating energy management performed on a link by a first device in a running process according to an embodiment of the present invention. As shown in FIG. 3, the first device performs the following operations when running:

Step 301: Read a current rate and bit width of a link from a link status register.

Step 302: Confirm that adjustment processing can be performed on the current rate and/or bit width.

Step 303: Obtain current traffic of the link.

Step 304: Compare the traffic with a certain preset traffic threshold value; if the traffic is smaller than the threshold, perform step 305, if the traffic is greater than the threshold, perform step 306.

Step 305: Generate adjustment information of lowering the current rate and/or bit width of the link by one level, and further perform step 307.

Step 306: Generate adjustment information of increasing the current rate and/or bit width by one level.

Step 307: Stop sending data.

Step 308: Clear a master enable bit of a configuration space command register of a device at an opposite end.

Step 309: Wait a preset period of time, so that the device at the opposite end finishes current data sending.

Step 310: Adjust the bit width by closing or opening a corresponding interface link lane or specifying an expected link bit width, or adjust the rate by specifying an expected link rate on a link control 2 register.

Step 311: Start re-negotiation and confirm that the negotiation is completed.

Step 312: Reset the master enable bit of the device at the opposite end, so that the device at the opposite end sends and receives data again.

The first device completes link adjustment once by performing the above processes. If the traffic is compared with another preset traffic threshold value and further adjustment is required, step 304 and subsequent steps are performed again.

Figure 4:
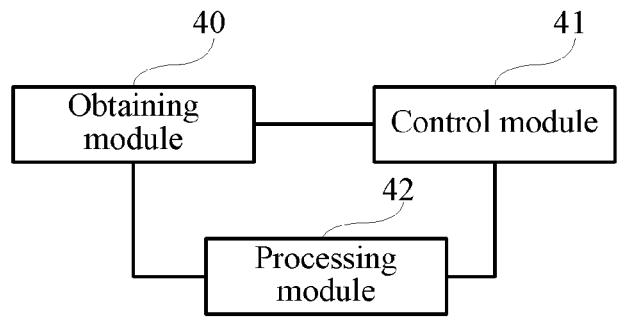
FIG. 4 is a schematic structural diagram of an embodiment of a PCI express device according to the present invention.

FIG. 4 is a schematic structural diagram of an embodiment of a PCI express device according to the present invention. As shown in FIG. 4, a PCI express device in this embodiment includes: an obtaining module 40, a control module 41 and a processing module 42. The obtaining module 40 is configured to obtain adjustment information for performing adjustment processing on a current rate and/or bit width of a PCI express link. The control module 41 is configured to stop data sending of the PCI express device, and clear a master enable bit of a configuration space command register of a second device at an opposite end of the link, so that the second device stops data sending after current data sending is finished, and is further configured to, after adjustment processing on the rate and/or bit width of the link, resume the data sending of the PCI express device, and reset the master enable bit, so that the PCI express device and the second device send and receive data again at a rate and/or bit width that is obtained after the adjustment processing. The processing module 42 is configured to perform the adjustment processing on the rate and/or bit width of the link according to the adjustment information.

In the embodiment of the present invention, after the obtaining module 40 obtains the adjustment information for adjusting the rate and/or bit width of the link, the control module 41 first stops data sending of the PCI express device at the local end of the link, and then clears the master enable bit of the device at the opposite end, so that the device at the opposite end also stops data sending after current data sending is finished. When the devices at two ends of the PCI express link stop data sending and receiving, the processing module 42 performs adjustment processing on the rate and/or bit width of the link according to the adjustment information obtained by the obtaining module. When the adjustment processing is finished, the control module 41 resumes the data sending at a local end, and at the same time, resets the master enable bit of the device at the opposite end, so that the device at the opposite end also resumes the data sending, thereby ensuring that the link is recovered to a normal transmission state after the adjustment.

In the embodiment of the present invention, the processing module implements link energy management by adjusting the rate and/or bit width of the link. In addition, before the processing module adjusts the rate and/or bit width of the link, the control module clears the master enable bit of the configuration space command register of the device at the opposite end of the link, so that the device at the opposite end of the link stops data sending after the current data sending is finished, ensuring that data being transmitted in the link is not lost due to the link adjustment, thereby ensuring that a link service is not affected by the link adjustment.

Figure 5:
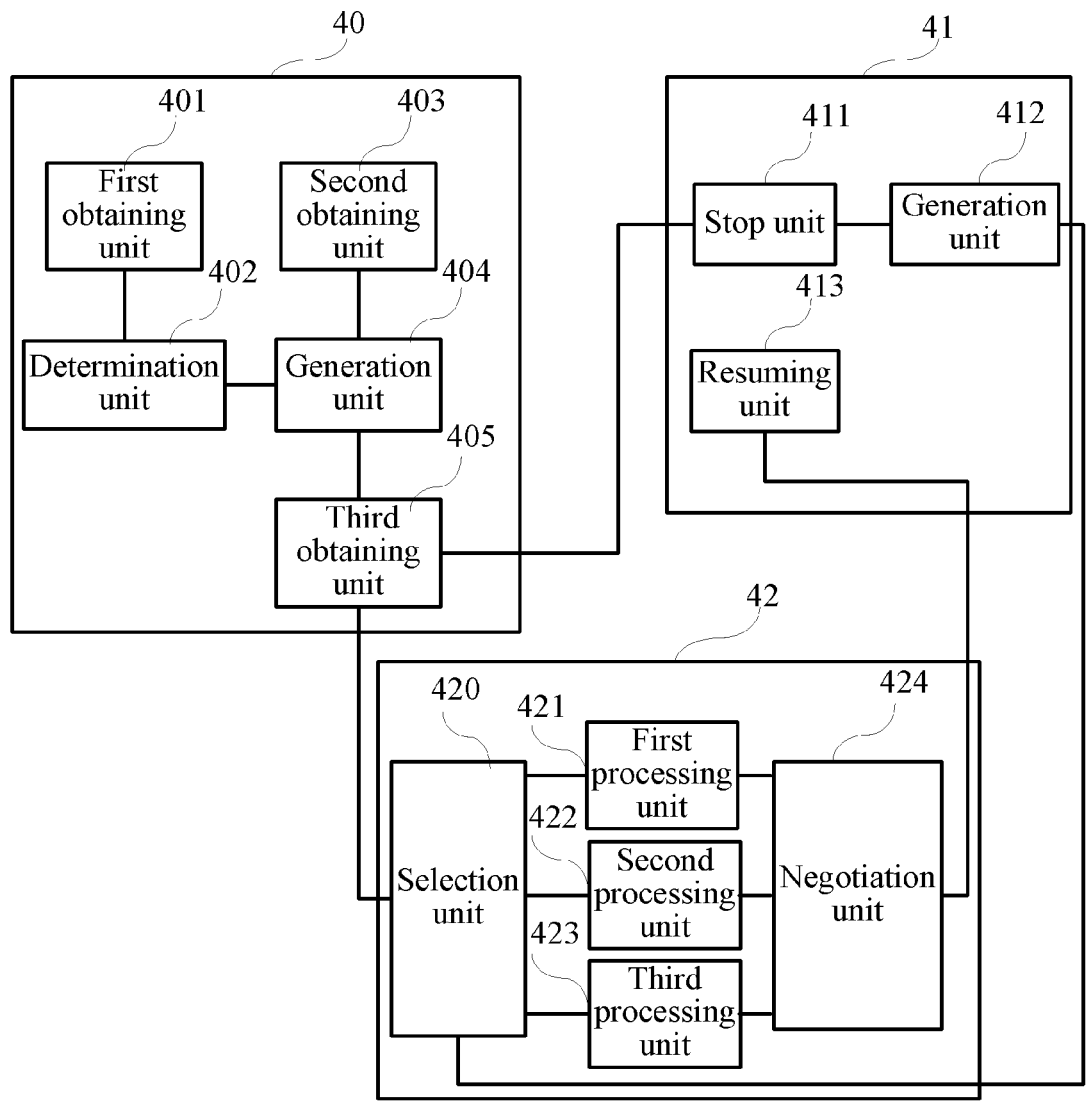
FIG. 5 is a schematic structural diagram of another embodiment of a PCI express device according to the present invention.

FIG. 5 is a schematic structural diagram of another embodiment of a PCI express device according to the present invention. As shown in FIG. 5, in the PCI express device in this embodiment, based on the embodiment shown in FIG. 4, the obtaining module 40 may include multiple obtaining units, configured to obtain corresponding pre-processing information. The control module 41 may include a generating unit, configured to generate corresponding control information. The processing module 42 may include a negotiation unit, configured to re-negotiate with the device at the opposite end.

Specifically, the obtaining module 40 includes a first obtaining unit 401, a second obtaining unit 403, a third obtaining unit 405, a determination unit 402 and a generating unit 404. The first obtaining unit 401 is configured to read the current rate and bit width of the link from a link status register. The determination unit 402 is configured to, according to an allowable transmission rate and bit width of the link and the current rate and bit width, determine to adjust the current rate and/or bit width of the link. The PCI express device can determine, through the determination unit 402, whether the current rate and/or bit width of the link can be adjusted. The second obtaining unit 403 is configured to obtain the number of interruption times or a count of packets sent and received through the link in unit time, and determine current traffic of the link according to the number of interruption times or the count of packets. The generating unit 404 is configured to generate, according to a result of comparison between the traffic and a preset traffic threshold value, adjustment information for the current rate and/or bit width of the PCI express link, when the determination unit 402 determines that the link can be adjusted. In a process of generating the adjustment information, the generating unit 404 may compare the traffic obtained by the second obtaining unit 403 with different preset traffic threshold values, so that the PCI express device adjusts the link in stages according to the volume of the traffic, and is capable of precisely adjusting the current rate and bit width of the link to proper values. The third obtaining unit 405 is configured to obtain the adjustment information generated by the generating unit 404, so that the control module 41 stops data sending in the link, and the processing module 42 performs corresponding adjustment processing according to the adjustment information.

The control module 41 includes a stop unit 411, a resuming unit 413 and a generating unit 412. The stop unit 411 is configured to stop the data sending of the PCI express device, and clear the master enable bit of the configuration space command register of the device at the opposite end of the link, so that the device at the opposite end stops the data sending after the current data sending is finished. The resuming unit 413 is configured to, after the adjustment processing on the rate and/or bit width of the link, resume the data sending of the PCI express device, and reset the master enable bit, so that the PCI express device and the device at the opposite end send and receive data again at the rate and/or bit width that is obtained after the adjustment processing. The generating unit 412 is configured to, after the stop unit 411 clears the master enable bit of the configuration space command register of the device at the opposite end of the link, wait a preset period of time, and generate stop information; alternatively, the PCI express device generates stop information after receiving a finish flag of current data sent by the device at the opposite end, so that the control module 41 controls the processing module 42 to start the adjustment processing on the rate and/or bit width of the link according to the stop information.

The processing module 42 may also include a selection unit 420, a first processing unit 421, a second processing unit 422, a third processing unit 423 and a negotiation unit 424. The selection unit 420 is configured to select, according to the adjustment information obtained by the obtaining module 40, a corresponding processing unit for processing the link. The first processing unit 421 is configured to: if the adjustment information is lowering the current bit width of the link to a certain link bit width, perform adjustment processing on the current bit width of the link by closing any interface link lane between the link bit width and an upper-level link bit width of the link bit width; and if the adjustment information is increasing the current bit width of the link to a certain link bit width, perform adjustment processing on the current bit width of the link by opening all interface link lanes corresponding to the link bit width. The first processing unit sets a lane disabling function of the interface link to adjust the bit width of the link, so that a PCI express device without a dynamic bit width adjustment function is also capable of implementing link energy management by using a flexible bit width adjustment method. The second processing unit 422 is configured to: if the adjustment information is lowering or increasing the current bit width of the link to a certain link bit width, perform adjustment processing on the current bit width of the link by setting the current bit width of the link to the link bit width. The second processing unit 422 may provide the device with a bit width adjustment functional module that uses a manner similar to link rate adjustment. The third processing unit 423 is configured to: if the adjustment information is lowering or increasing the current rate of the link to a certain link rate, write the link rate into a link control 2 register, and when the current rate of the link is adjusted, perform adjustment processing on the current rate of the link according to the rate value written in the link control 2 register. The negotiation unit 424 is configured to: start re-negotiation according to a link re-negotiation enable bit in a link control register, so that the PCI express device and the device at the opposite end adjust the rate and/or bit width for sending and receiving data to the rate and/or bit width that is obtained after the adjustment processing of the PCI express device; and according to the link negotiation state value in the link status register, confirm that the re-negotiation is completed. The negotiation unit 424 starts the re-negotiation with the device at the opposite end after the processing unit adjusts the link, so that the devices at the two ends can adjust rates and/or bit widths for sending and receiving data to the rate and/or bit width of the link that is obtained after the adjustment processing, ensuring that the rates and bit widths for sending and receiving data at the two ends match the rate and bit width of the link that have been adjusted by the PCI express device. The PCI express device resumes the data sending and receiving at the two ends of the link after the devices at the two ends finish re-negotiation and it is confirmed that the negotiation is completed.

Based on the technical effect of the first embodiment of the PCI express device, in this embodiment, the generating unit in the obtaining module further compares the traffic with different preset traffic threshold values, and generate corresponding adjustment information according to the result of the comparison, so that the PCI express device adjusts the link in stages according to the volume of the traffic, and is capable of precisely adjusting the current rate and bit width of the link to proper values. Through multiple processing units in the processing module, the PCI express device can select different adjustment manners to adjust the link. In addition, through the first processing unit, the PCI express device without a dynamic bit width adjustment function is also capable of implementing the link energy management by using a flexible bit width adjustment method.

In the above embodiment of the PCI express device, the PCI express device is a root complex device (Root Complex) of a PCI express or a device at a downlink interface of a PCI express switch (Switch). The device at the opposite end is an endpoint device (Endpoint) of the PCI express or a device at an uplink interface of the PCI express switch. The PCI express device may be used to perform the technical solutions of the above embodiments of the PCI express link energy management method; the working principle and achieved technical effect thereof are similar to those of the method embodiment.

Figure 6:
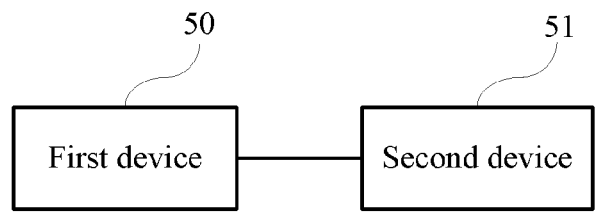
FIG. 6 is a schematic structural diagram of an embodiment of a PCI express link energy management system according to the present invention.

FIG. 6 is a schematic structural diagram of an embodiment of a PCI express link energy management system according to the present invention. As shown in FIG. 6, the PCI express link energy management system in this embodiment includes a first device 50 and a second device 51 that send data to and receive data from each other. The first device 50 is the PCI express device in the embodiment shown in FIG. 4 or FIG. 5; the second device 51 is an endpoint device of a PCI express or a device at an uplink interface of a PCI express switch.

This embodiment may use the technical solution described in the above embodiment of the PCI express link energy management method; the technical principle and achieved technical effect thereof are similar to those of the method embodiment, which are not described herein again.

Figure 7:
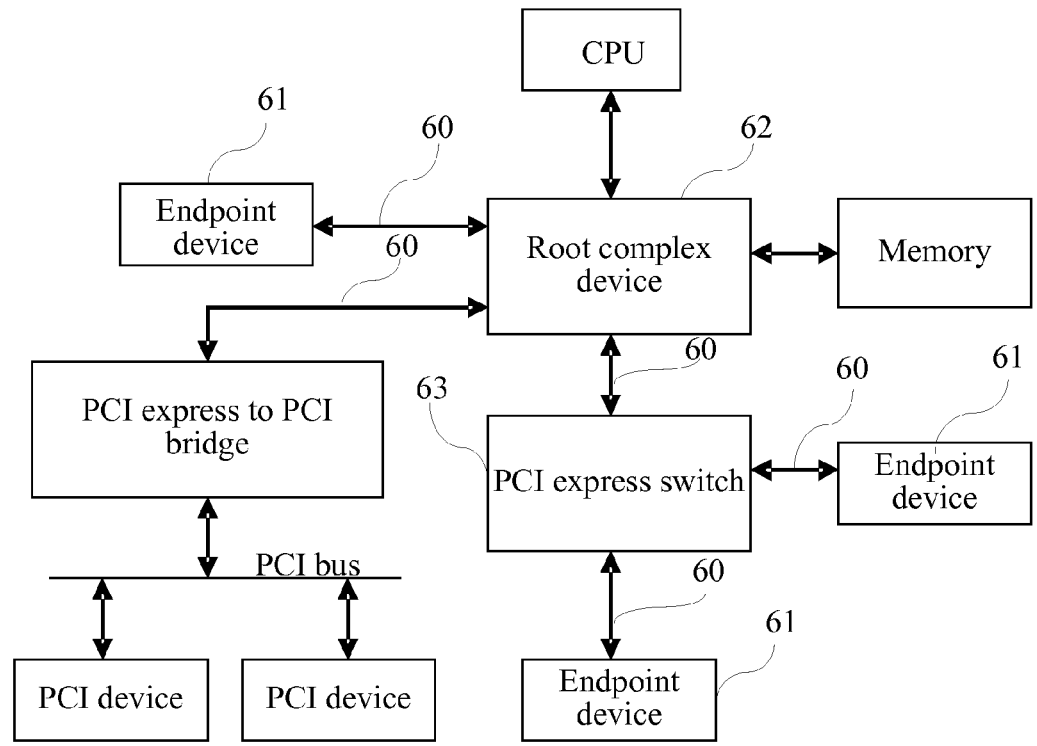
FIG. 7 is an example diagram illustrating an embodiment of the present invention being applied to a PCI express system.

FIG. 7 is an example diagram illustrating an embodiment of the present invention being applied to a PCI express system. The PCI express system shown in FIG. 7 includes multiple data sending devices based on a PCI express link 60. In practical applications, the first device or the PCI express device in above embodiments of the present invention may be a root complex device 62 in FIG. 7, or a device at a downlink interface of a PCI express switch 63. The second device or the device at the opposite end may be an endpoint device 61 such as an Ethernet controller, or a device at an uplink interface of the PCI express switch 63. When the PCI express system is running, for example, the PCI express link 60 between the root complex device 62 and the endpoint device 61 uses the energy management method in the embodiment of the present invention. When traffic in the PCI express link 60 is small, the root complex device 62 may generate adjustment information by detecting the traffic. The root complex device 62 first stops sending data to the endpoint device 61, and then clears a master enable bit of the endpoint device 61 so that the endpoint device 61 suspends sending data to the root complex device 62 after finishing current data sending. After waiting a preset period of time, the root complex device 62 performs adjustment processing on the rate and/or bit width of the link according to the adjustment information, and re-negotiates with the endpoint device 61, so that rates and/or bit widths for sending and receiving data at two ends are adjusted to the rate and/or bit width that is obtained after the adjustment processing of the root complex device 62. The root complex device 62 resumes sending data to the endpoint device 61 after confirming that the negotiation is completed, and at the same time, resets the master enable bit of the endpoint device 61, so that the endpoint device 63 resends data to the root complex device 62. Before the adjustment processing, the root complex device 62 clears the master enable bit of the endpoint device, so that the endpoint device stops data sending before the link adjustment, thereby avoiding loss of data being sent and received in the link, ensuring that a link service is not affected by the link adjustment, and improving the security of data transmission during link energy management. In addition, if the root complex device 62 does not have a bit width adjustment function, the root complex device 62 may also implement adjustment of the link bit width by setting an interface link lane as described in the above embodiment of the present invention, which improves the flexibility of the link adjustment in the link energy management.

Persons of ordinary skill in the art may understand that all or a part of the steps in the method embodiments may be implemented by a program instructing relevant hardware. The program may be stored in a computer readable storage medium. When the program is run, the steps in the method embodiments are performed. The storage medium may include various media capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the exemplary embodiments, persons of ordinary skill in the art should understand that they may still make modifications or equivalent replacements to the technical solutions described in the present invention, and such modifications or equivalent replacements cannot make modified technical solutions depart from the spirit and scope of the technical solutions of the embodiments of the present invention.

What is claimed is:

1. A PCI express link energy management method, comprising:
   obtaining, by a first device, adjustment information for performing adjustment processing on a current rate and/or bit width of a PCI express link;
   stopping, by the first device, data sending, and clearing, by the first device, a master enable bit of a configuration space command register of a second device at an opposite end of the link, so that the second device stops data sending after current data sending is finished;
   performing, by the first device, adjustment processing on the rate and/or bit width of the link according to the adjustment information; and
   resuming, by the first device, the data sending, and resetting the master enable bit, so that the first device and the second device send and receive data again at a rate and/or bit width that is obtained after the adjustment processing.

2. The method according to claim 1, wherein the performing, by the first device, adjustment processing on the bit width of the link according to the adjustment information specifically is:

performing, by the first device, the adjustment processing on the current bit width of the link according to the adjustment information by setting a lane disabling function.

3. The method according to claim 2, wherein the performing, by the first device, the adjustment processing on the current bit width of the link according to the adjustment information by setting the lane disabling function specifically comprises:
if the adjustment information is lowering the current bit width of the link to a certain link bit width, performing, by the first device, the adjustment processing on the current bit width of the link by closing any interface link lane between the link bit width and an upper-level link bit width of the link bit width; and
if the adjustment information is increasing the current bit width of the link to a certain link bit width, performing, by the first device, the adjustment processing on the current bit width of the link by opening all interface link lane corresponding to the link bit width.

4. The method according to claim 1, wherein the performing, by the first device, adjustment processing on the bit width of the link according to the adjustment information specifically is:
if the adjustment information is lowering or increasing the current bit width of the link to a certain link bit width, performing, by the first device, adjustment processing on the current bit width of the link by setting the current bit width of the link to the link bit width.

5. The method according to claim 1, wherein the performing, by the first device, adjustment processing on the rate of the link according to the adjustment information is:
if the adjustment information is lowering or increasing the current rate of the link to a certain link rate, writing, by the first device, the link rate into a link control 2 register; and
when the current rate of the link is adjusted, performing, by the first device, the adjustment processing on the current rate of the link according to a rate value written in the link control 2 register.

6. The method according to claim 1, after the performing, by the first device, the adjustment processing on the rate and/or bit width of the link according to the adjustment information, further comprising:
starting, by the first device, re-negotiation according to a link re-negotiation enable bit in a link control register, so that the first device and the second device adjust rates and/or bit widths for sending and receiving data to the rate and/or bit width that is obtained after adjustment processing of the first device; and
according to a link negotiation state value in a link status register, confirming that the re-negotiation is completed.

7. The method according to claim 6, before the obtaining, by the first device, the adjustment information for performing the adjustment processing on the current rate and/or bit width of the PCI express link, further comprising:
reading, by the first device, the current rate and bit width of the link from the link status register; and
according to an allowable transmission rate and bit width of the link and the current rate and bit width of the link, determining to adjust the current rate and/or bit width of the link.

8. The method according to claim 7, after the performing, by the first device, the adjustment processing on the rate and/or bit width of the link according to the adjustment information, further comprising:

updating, by the first device, the rate and bit width in the link status register according to the rate and bit width that are obtained after the adjustment processing;
wherein correspondingly, the first device sending and receiving data again at the rate and/or bit width that is obtained after the adjustment processing specifically is:
the first device sending and receiving data again according to an updated rate and bit width in the link status register.

9. The method according to claim 7, after the first device determines to adjust the current rate and/or bit width of the link, according to the allowable transmission rate and bit width of the link and the current rate and bit width of the link, further comprising:
obtaining, by the first device, current traffic of the link; and
generating adjustment information for the current rate and/or bit width of the PCI express link according to a result of comparison between the traffic and a preset traffic threshold value.

10. The method according to claim 9, wherein there are multiple traffic threshold values, and each traffic threshold value corresponds to a rate and bit width of a specific bandwidth of the link;
correspondingly, the generating the adjustment information for the current rate and/or bit width of the PCI express link according to the result of the comparison between the traffic and the preset traffic threshold value specifically is:
generating, according to a result of comparison between the traffic and a certain preset traffic threshold value, adjustment information for adjusting the current rate and/or bit width of the link to a rate and bit width corresponding to a traffic threshold value.

11. The method according to claim 9, wherein the obtaining, by the first device, the current traffic of the link specifically comprises:
obtaining the number of interruption times or a count of packets sent and received through the link in unit time; and
determining the current traffic of the link according to the number of interruption times or the count of packets.

12. The method according to claim 1, after the clearing, by the first device, the master enable bit of the configuration space command register of the second device at the opposite end of the link, further comprising:
after clearing the master enable bit of the configuration space command register of the second device at the opposite end of the link, waiting, by the first device, a preset period of time and generating stop information; or
generating stop information after receiving a finish flag of the current data sent by the second device;
wherein correspondingly, the performing, by the first device, the adjustment processing on the rate and/or bit width of the link according to the adjustment information specifically is:
starting adjustment processing on the rate and/or bit width of the link according to the stop information.

13. The method according to claim 1, wherein the first device is a root complex device of a PCI express or a device at a downlink interface of a PCI express switch; and the second device is an endpoint device of the PCI express or a device at an uplink interface of the PCI express switch.

14. A PCI express device, comprising:
an obtaining module, configured to obtain adjustment information for performing adjustment processing on a current rate and/or bit width of a PCI express link;
a control module, configured to stop data sending of the PCI express device, and clear a master enable bit of a configuration space command register of a device at an opposite end of the link, so that the device at the opposite end stops data sending after current data sending is finished; and further configured to, after adjustment processing on the rate and/or bit width of the link, resume the data sending of the PCI express device, and reset the master enable bit, so that the PCI express device and the device at the opposite end send and receive data again at a rate and/or bit width that is obtained after the adjustment processing; and a processing module, configured to perform the adjustment processing on the rate and/or bit width of the link according to the adjustment information, wherein the obtaining module, the control module, and the processing module include at least one processor.

15. The device according to claim 14, wherein the processing module comprises a first processing unit which includes at least one processor;

the first processing unit is configured to: if the adjustment information is lowering the current bit width of the link to a certain link bit width, perform adjustment processing on the current bit width of the link by closing any interface link lane between the link bit width and an upper-level link bit width of the link bit width; and if the adjustment information is increasing the current bit width of the link to a certain link bit width, perform adjustment processing on the current bit width of the link by opening all interface link lanes corresponding to the link bit width.

16. The device according to claim 14, wherein the processing module comprises a second processing unit which includes at least one processor;

the second processing unit is configured to: if the adjustment information is lowering or increasing the current bit width of the link to a certain link bit width, perform adjustment processing on the current bit width of the link by setting the current bit width of the link to the link bit width.

17. The device according to claim 14, wherein the processing module comprises a third processing unit which includes at least one processor;

the third processing unit is configured to: if the adjustment information is lowering or increasing the current rate of the link to a certain link rate, write the link rate into a link control 2 register; and when the current rate of the link is adjusted, perform adjustment processing on the current rate of the link according to a rate value written in the link control 2 register.

18. The device according to claim 15, wherein the processing module further comprises a negotiation unit which includes at least one processor;

the negotiation unit is configured to start re-negotiation according to a link re-negotiation enable bit in a link control register, so that the PCI express device and the device at the opposite end adjust rates and/or bit widths for sending and receiving data to the rate and/or bit width that is obtained after the adjustment processing of the PCI express device; and according to a link negotiation state value in a link status register, confirm that the re-negotiation is completed.

19. The device according to claim 18, wherein the obtaining module is further configured to read the current rate and bit width of the link from the link status register, and according to an allowable transmission rate and bit width of the link and the current rate and bit width, determine to adjust the current rate and/or bit width of the link; and is configured to obtain the number of interruption times or a count of packets sent or received through the link in unit time, and determine current traffic of the link according to the number of interruption times or the count of packets; and generate adjustment information for the current rate and/or bit width of the PCI express link according to a result of comparison between the traffic and a preset traffic threshold value.

20. The device according to claim 14, wherein the control module is further configured to, after clearing the master enable bit of the configuration space command register of the device at the opposite end of the link, wait a preset period of time and generate stop information; or generate stop information after the PCI express device receives a finish flag of the current data sent by the device at the opposite end; and the processing module is specifically configured to start the adjustment processing on the rate and/or bit width of the link according to the stop information.

21. An apparatus comprising:

a PCI express device including at least one processor and configured to obtain adjustment information for performing adjustment processing on a current rate and/or bit width of a PCI express link, to stop data sending of the PCI express device, and clear a master enable bit of a configuration space command register of a device at an opposite end of the link, so that the device at the opposite end stops data sending after current data sending is finished, to, after adjustment processing on the rate and/or bit width of the link, resume the data sending of the PCI express device, and reset the master enable bit, so that the PCI express device and the device at the opposite end send and receive data again at a rate and/or bit width that is obtained after the adjustment processing and to perform the adjustment processing on the rate and/or bit width of the link according to the adjustment information.

* * * * *